(No Model.) 2 Sheets—Sheet 1.

J. R. FINNEY.
ELECTRIC VEHICLE.

No. 270,186. Patented Jan. 2, 1883.

Witnesses.
Jno. K. Smith
L. C. Fitler.

Inventor.
Joseph R. Finney
by his attys
Bakewell & Kerr

N. PETERS, Photo-Lithographer, Washington, D. C.

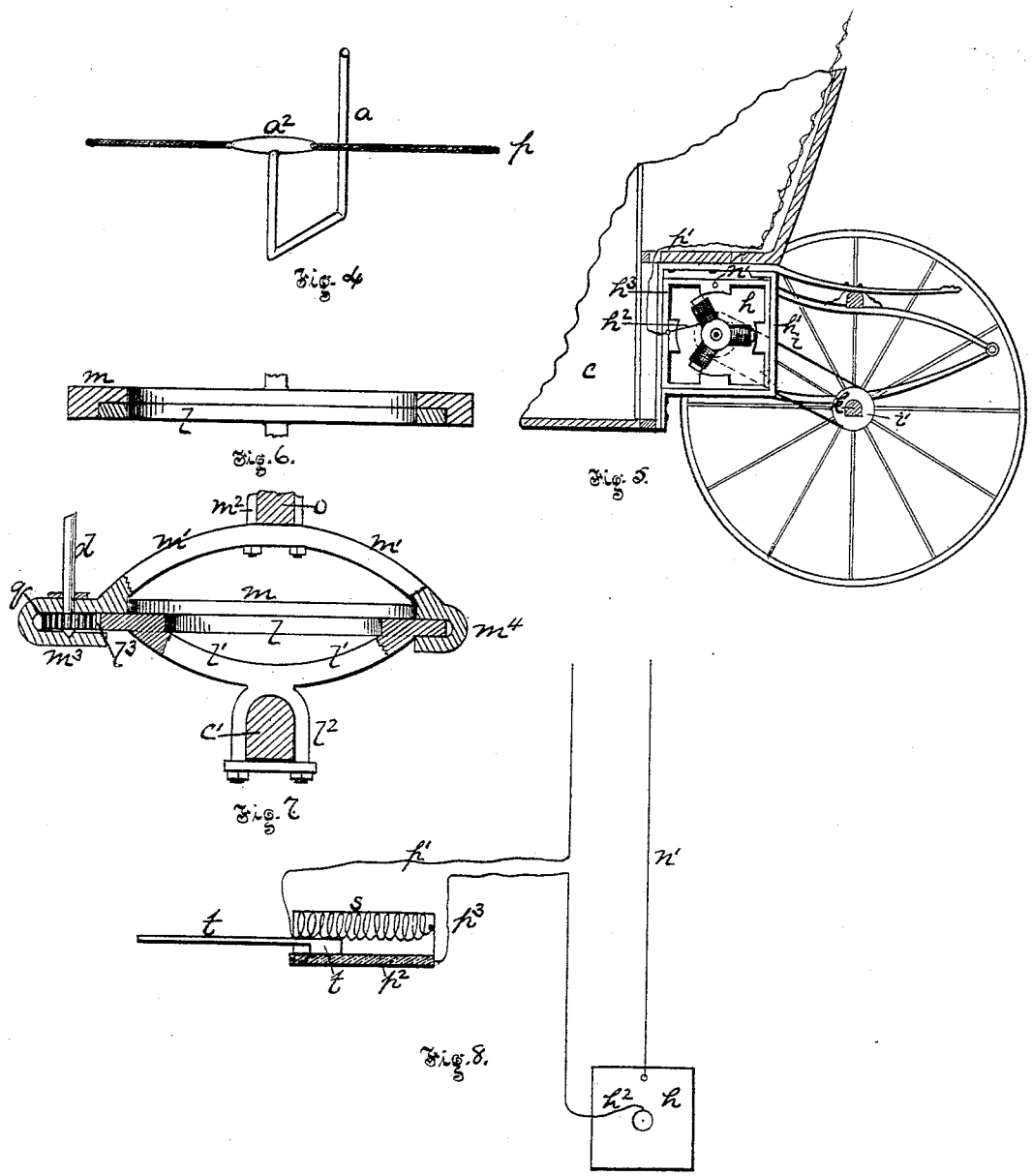

UNITED STATES PATENT OFFICE.

JOSEPH R. FINNEY, OF PITTSBURG, ASSIGNOR TO HIMSELF AND THOMAS B. KERR, OF ALLEGHENY CITY, PENNSYLVANIA.

ELECTRIC VEHICLE.

SPECIFICATION forming part of Letters Patent No. 270,186, dated January 2, 1883.

Application filed September 9, 1882. (No model.)

*To all whom it may concern:*

Be it known that I, JOSEPH R. FINNEY, of Pittsburg, in the county of Allegheny and State of Pennsylvania, have invented a new and useful Improvement in Electric Vehicles; and I do hereby declare the following to be a full, clear, and exact description thereof, reference being had to the accompanying drawings, forming a part of this specification, in which—

Figure 1:
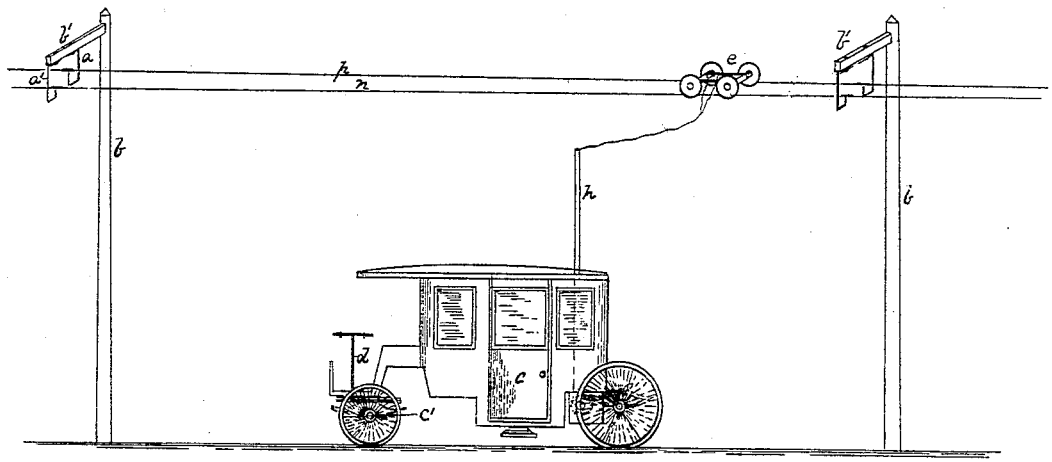
Figure 2:
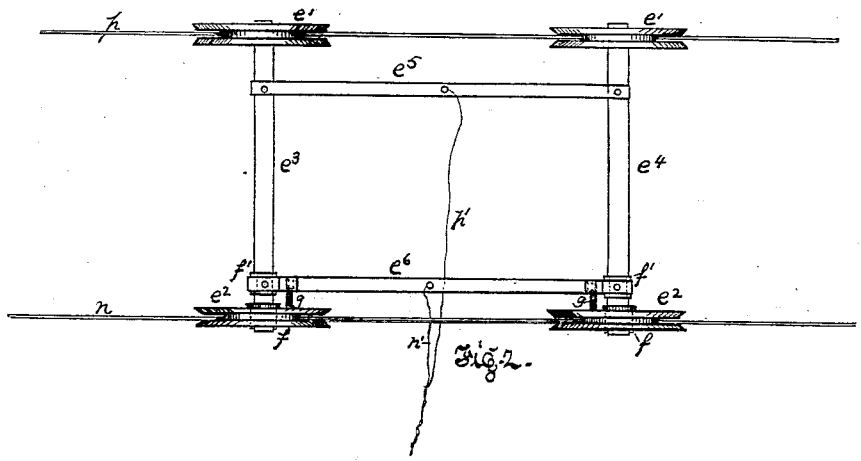
Figure 3:
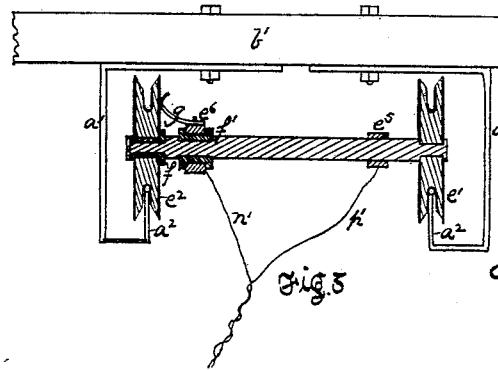

Figure 1 is a perspective view of an electric carriage, elevated conductors, and traveling contact illustrating my invention. Fig. 2 is a plan view of the traveling contact. Fig. 3 is a view of the bracket for supporting the conductors, and shows a sectional view of the traveler. Fig. 4 is an enlarged view of one of the brackets which sustain the main conductors. Fig. 5 is a view illustrating the power-connection between the motor-shaft and the axle of the vehicle. Figs. 6 and 7 are transverse sections of the fifth-wheel. Fig. 8 is a diagram illustrating the application of an adjustable resistance in the branch conductor.

Like letters of reference indicate like parts in each.

My improvement relates to that class of electric vehicles in which there is an overhead electrical conductor for conveying the electric current along the roadway or line of travel of the vehicle, an electrical contact mounted on and capable of traveling along said conductor, and a branch conductor extending from the traveler to and connected with an electromotor mounted on the vehicle. Heretofore such vehicles have been constructed especially for the purpose of traveling upon a railroad or tramway. My present invention is directed to the practical application of such system for the propulsion of vehicles upon an ordinary road.

To this end I suspend overhead, above, or at the side of a road two electrical conductors, $p$ and $n$, made preferably of wire, and connect them to the opposite poles of a dynamo-electric machine or other suitable source of electricity. These conductors are sustained on brackets $a$ $a'$, to which they are fastened by smooth loops, as at $a^2$, Fig. 4, so as not greatly to increase their thickness at the point of suspension. The brackets $a$ $a'$ are fastened to the insulating or wooden cross-arms $b'$ of the posts $b$, or to other suitable supports. A suitable carriage, $c$, or other vehicle is provided with a suitable electromotor, $h$, placed thereon and having its shaft connected by a band, $i$, chain, or gearing to one of the axles (preferably the rear axle) of the vehicle, whereby its power is transmitted and applied to rotate the axle and thereby propel the vehicle. The vehicle is also provided with a pilot or pivoted axle (in the present instance the forward axle, $c'$,) which is operated by a shaft, $d$, and band wheel or lever for the purpose of turning and directing the movements of the vehicle, the said wheel or lever being placed in convenient relation to the seat of the driver, so that it may be operated by him. In the present instance the band $i$ passes over the pulley $i'$, which is secured upon the axle $k$ by a squared portion. The body of the vehicle is sustained on the axle $k$ by suitable bearings or boxes, which permit the axle to turn. The motor is fastened to the body by suitable iron straps, $h'$. The fifth-wheel is composed of two circle-plates, $l$ $m$, one of which, $l$, is fastened by braces $l'$ and yoke $l^2$ to the axle $c'$, and the other, $m$, by braces $m'$ and yoke $m^2$ to the head-block $o$. Stays $m^3$ $m^4$ extend from the edges of the plate $m$ at two or more points around the edge of and under the plate $l$, and serve to keep the plates together. The front edge of the plate $l$ is provided with gear-teeth, as at $l^3$, any desired distance around its circumference. In the recess formed by bending the stay $m^3$ around is a pinion, $q$, which is mounted on the shaft $d$. The shaft $d$ is stepped in the stay $m^3$, and the pinion $q$ is in gear with the teeth on the periphery of the circle-plate $l$, so that by turning the shaft the circle-plate $l$, and thereby the axle $c'$, is turned in the desired direction.

The traveling contact $e$ is a small carriage, composed of four grooved wheels or sheaves, $e'$ $e'$ $e^2$ $e^2$, mounted on axles $e^3$ $e^4$, which are connected by bars $e^5$ $e^6$. The flanges of the sheaves $e'$ $e^2$ are wide, so as to form deep grooves in their peripheries. The brackets $a$ $a'$ are bent upward at their outer ends to form vertical standards $a^2$, upon which the conductors $p$ and $n$ are mounted, so that the grooved sheaves may pass along them without striking and being interfered with or dislodged by the bracket-arms. The axles $e^3$ $e^4$ are in electrical connection with each other by means of the bar $e^5$ and with the sheaves $e'$, but are insulated from the sheaves $e^2$ by means of the insulating-sleeves $f$, and the bar $e^6$ is insulated from the axles by insulating-sleeves $f'$. From the bar $e^6$ contact springs or brushes $g$ extend into contact with the sides of the sheaves $e^2$. The bars $e^5$ $e^6$ are electrically connected with the opposite poles of the electromotor on the vehicle by branch conductors $p'$ $n'$, said branch conductors being flexible and sufficiently long to permit the vehicle to go from side to side of the roadway without straining on the traveler. The conductors $p'$ $n'$ are properly insulated from each other by an insulating-covering, and are preferably led to the vehicle together. In order to insure their clearing hay-wagons and such things, liable to be met on a road, I place a pole or standard, $h$, upon the vehicle and lead the conductors $p'$ $n'$ to and down it, such pole being of sufficient height to effect its purpose. The wire $p'$ extends to the commutator-brush $h^2$, Fig. 5, and the wire $n'$ to the metallic motor-case $h^3$, which is in electrical connection with the coils of the motor through the motor-shaft, said shaft having its bearings in the ends of the case. The circuit is from the machine or other source of electric current by the conductor $p$, sheaves $e'$, bar $e^5$, and branch $p'$ to the motor, thence by branch $n'$, bar $e^6$, brushes $g$, sheaves $e^2$, and conductor $n$, to the machine. If more than one vehicle is operated on the circuit, a suitable adjustable resistance may, if desired, be placed in the branch conductor leading to each, which resistance may be increased or diminished by the driver as the vehicle requires less or more power. This is illustrated in Fig. 8, where $s$ is a resistance-coil connected to the conductor $p'$ and $t$ is moving contact, which is in electrical connection with the coil $s$ and rests on a conductor, $p^2$, which is connected with the motor by a wire, $p^3$. The handle $t'$ of the contact $t$ is placed within the reach of the driver, who moves it in or out as he desires to increase or reduce the resistance. The resistance device is placed in any convenient part of the vehicle.

The vehicle may be guided by the driver from one side of the road to the other, around passing vehicles and obstacles in the road, and may be turned at will by means of the pivoted axle or fifth-wheel and turning-shaft. In the operation of a line of vehicles it is desirable that there be two lines of conductors, so that vehicles may be running in opposite directions at the same time without interference.

My invention is very useful for the establishment and operation of lines of stages upon roads or streets where it is not desirable to tear up the roadway for the laying of rails, or where the traffic will not justify such expense. It can be used for temporary lines, as the only structure necessary is the erection of poles and wires, which is easily and quickly done. Smooth and level roads, while desirable, are not necessary, as the vehicles may be operated on heavy grades and ordinary country roads.

The swiveling or pilot truck or axle may be used on electric cars running on a tramway and having but one overhead conductor and one branch conductor for the purpose of going around curves, &c. The same is true, also, of the pole $h$, which may also be used for railroad-telegraphs operated on the same principle.

It is apparent to the skilled mechanic that the construction of the traveler may be varied in many ways; but in all cases the contact-points on the opposite wires must be insulated from each other.

What I claim as my invention, and desire to secure by Letters Patent, is—

1. The combination of a machine or other source of electricity, conductors connected to the opposite poles of said source and extending overhead along a road or course, a traveling electrical contact mounted on and capable of traveling along said conductors, having its opposite contacts insulated from each other, a vehicle, an electromotor mounted on said vehicle and having power-connection with the axle thereof, and branch conductors extending from the traveler to the poles of the motor, substantially as and for the purposes described.

2. A vehicle having a pivoted guiding axle or truck and an electromotor mounted thereon, and having power-connection with the other axle, in combination with a dynamo-electric machine or other source of electric current, a conductor or conductors extending from the machine, a traveling contact mounted on said conductor, and a flexible branch conductor or conductors extending from the traveler to the motor, substantially as and for the purpose described.

3. A vehicle having a pole or standard for sustaining a branch electrical conductor, in combination with an overhead main conductor, and a traveling contact mounted on such main conductor and connected to the branch conductor, substantially as and for the purposes described.

In testimony whereof I have hereunto set my hand.

JOSEPH R. FINNEY.

Witnesses:
T. B. KERR,
JNO. K. SMITH.